(12) United States Patent  
Agapiou et al.

(10) Patent No.: US 8,499,438 B2  
(45) Date of Patent: Aug. 6, 2013

(54) SYSTEMS AND METHODS FOR JOINING WIRES OF A MOTOR STATOR

(75) Inventors: John S. Agapiou, Rochester Hills, MI (US); John Patrick Spicer, Plymouth, MI (US); Stephen R Smith, Holly, MI (US); Jeffrey A Abell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 81 days.

(21) Appl. No.: 13/036,259

(22) Filed: Feb. 28, 2011

(65) Prior Publication Data

US 2012/0216398 A1 Aug. 30, 2012

(51) Int. Cl.  
*B23P 19/00* (2006.01)

(52) U.S. Cl.  
USPC .................. 29/729; 29/597; 29/732; 29/745

(58) Field of Classification Search  
USPC ................ 29/597, 729, 732, 73, 745, 733  
See application file for complete search history.

(56) References Cited

U.S. PATENT DOCUMENTS

| | | | | |
|---|---|---|---|---|
| 3,946,145 A | * | 3/1976 | Warner | 174/94 R |
| 4,053,196 A | * | 10/1977 | Dunaway | 310/68 R |
| 5,210,928 A | * | 5/1993 | Seshita et al. | 29/596 |
| 7,847,465 B2 | * | 12/2010 | Tokizawa | 29/596 |
| 2003/0061704 A1 | * | 4/2003 | Nosal et al. | 29/597 |
| 2008/0191574 A1 | * | 8/2008 | Tokizawa | 310/179 |
| 2011/0035932 A1 | * | 2/2011 | Swift et al. | 29/593 |
| 2011/0041320 A1 | * | 2/2011 | Tokizawa | 29/596 |

* cited by examiner

*Primary Examiner* — Carl Arbes  
(74) *Attorney, Agent, or Firm* — Parks IP Law LLC

(57) ABSTRACT

An apparatus for joining a wire pair of a stator coil. The apparatus includes a tool having a pair of electrodes and control equipment. The control equipment is configured to control the electrodes to apply force to the wire pair to push adjacent wires of the wire pair toward each other and cause current to pass between the pair of electrodes, and so through the wire pair pushed together, at a time at which the force is being applied to the wire pair.

14 Claims, 7 Drawing Sheets

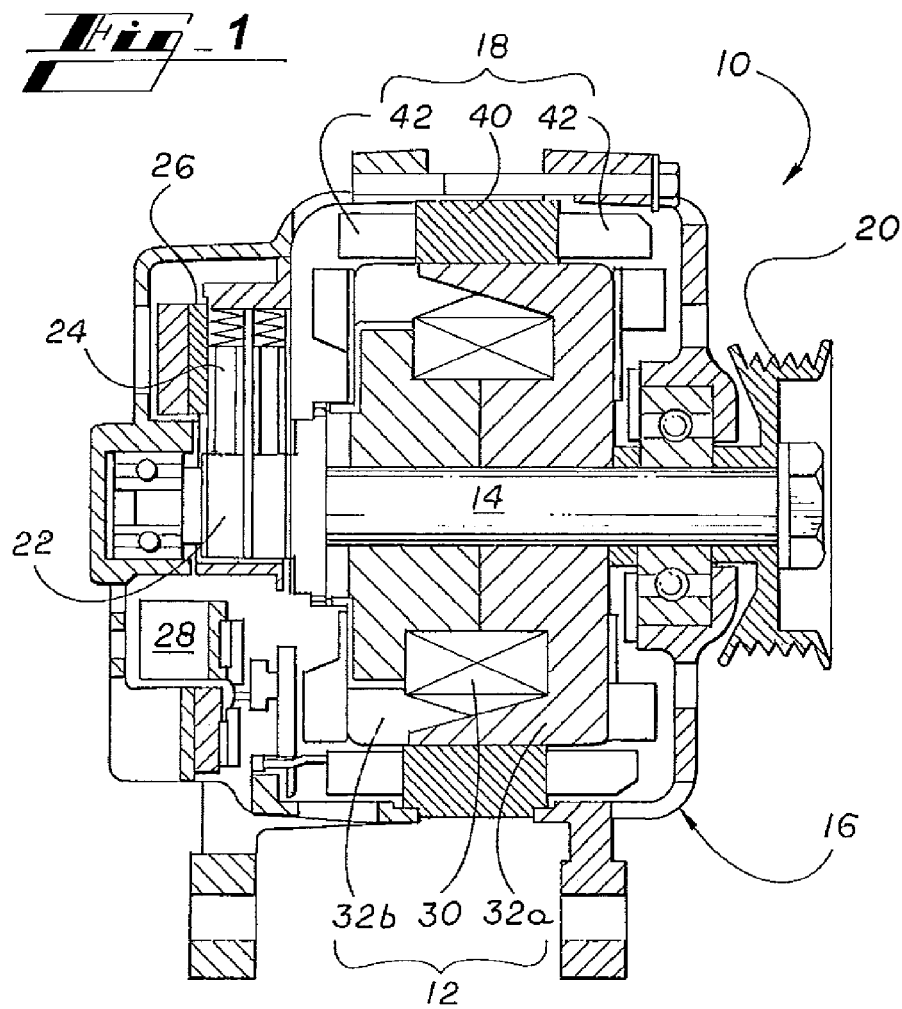
Fig_1
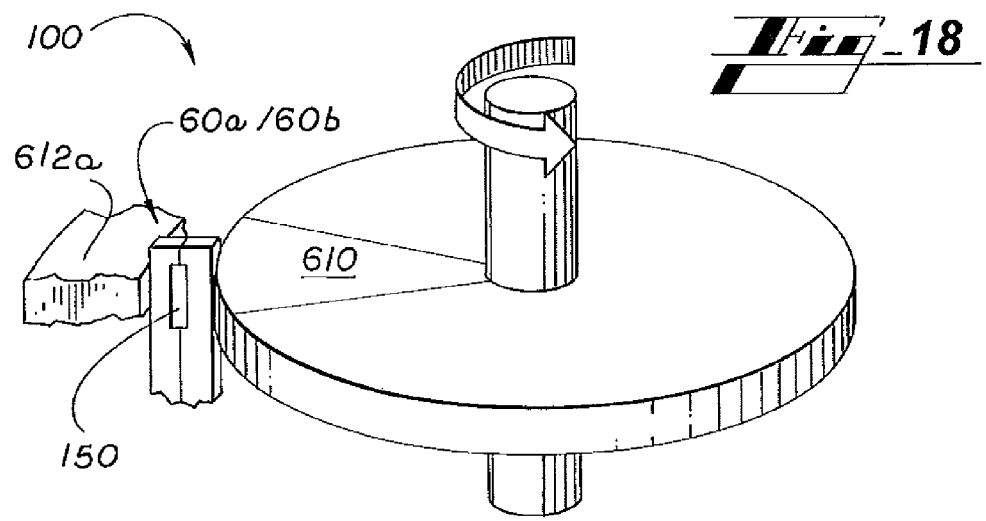
Fig_18

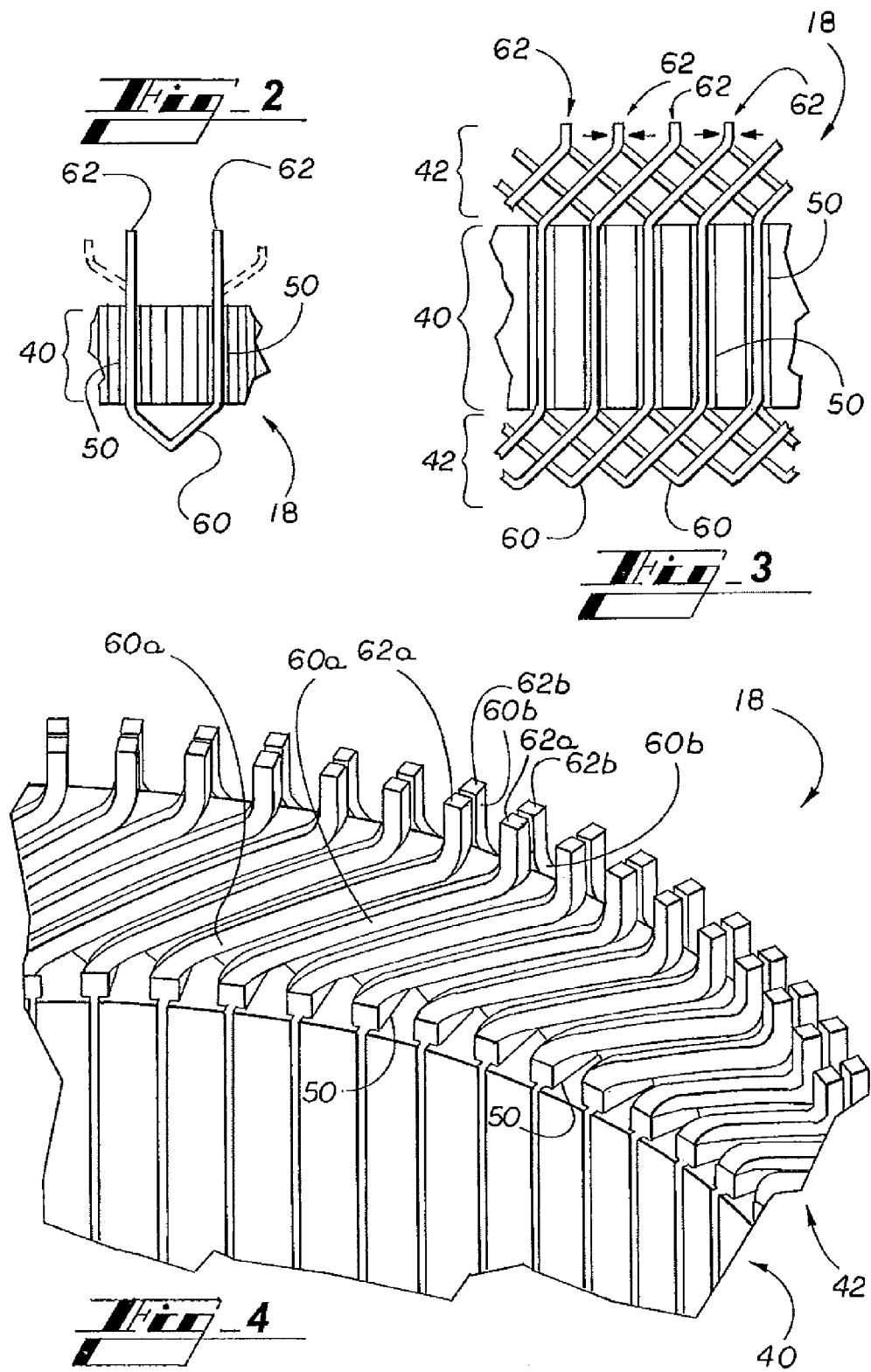

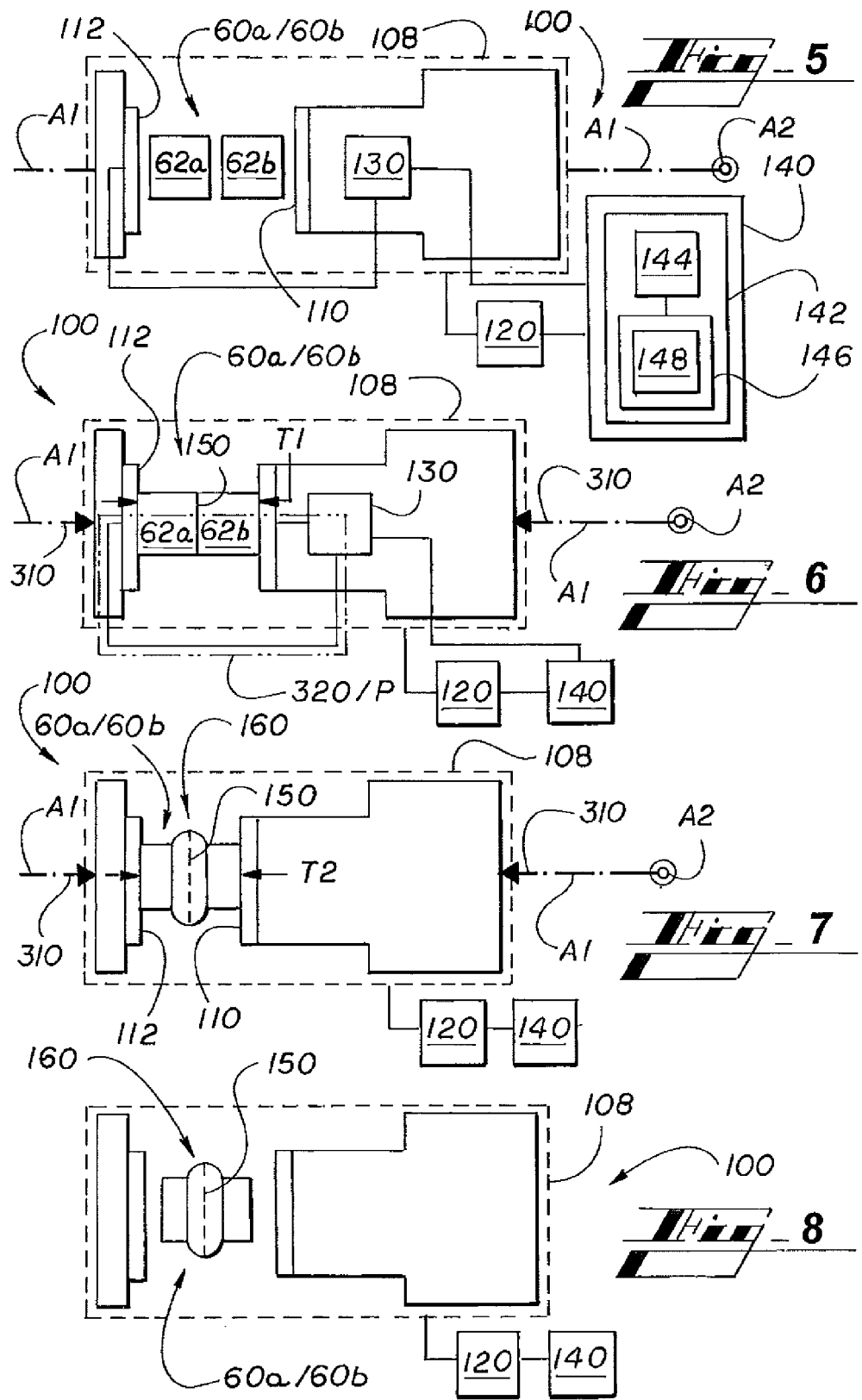

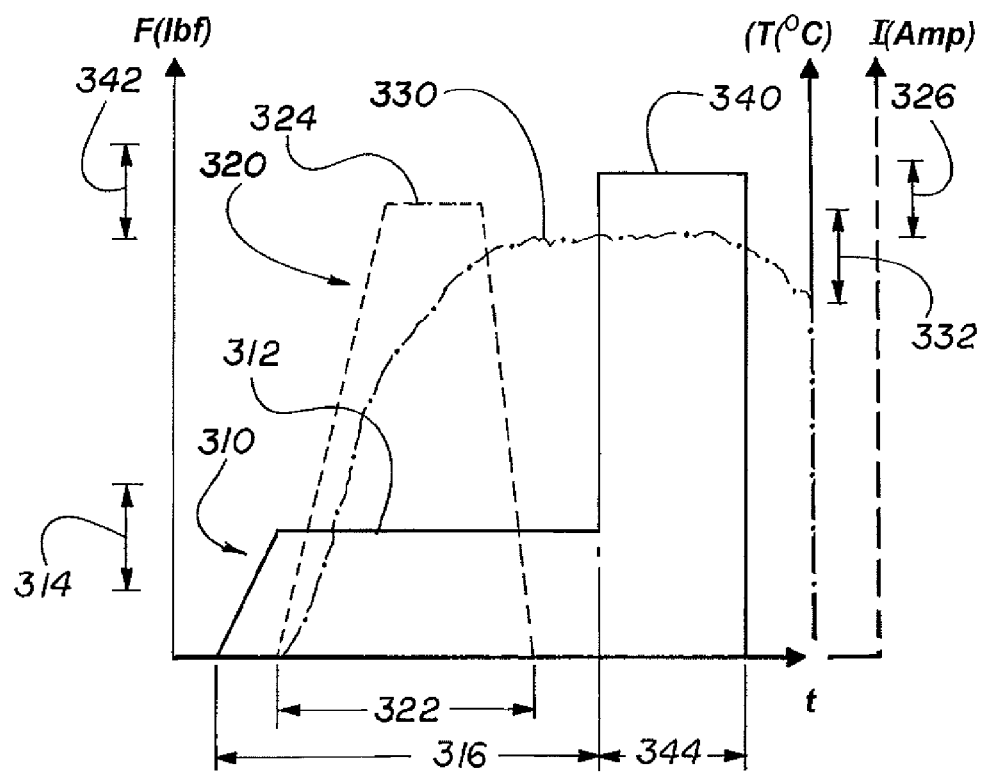
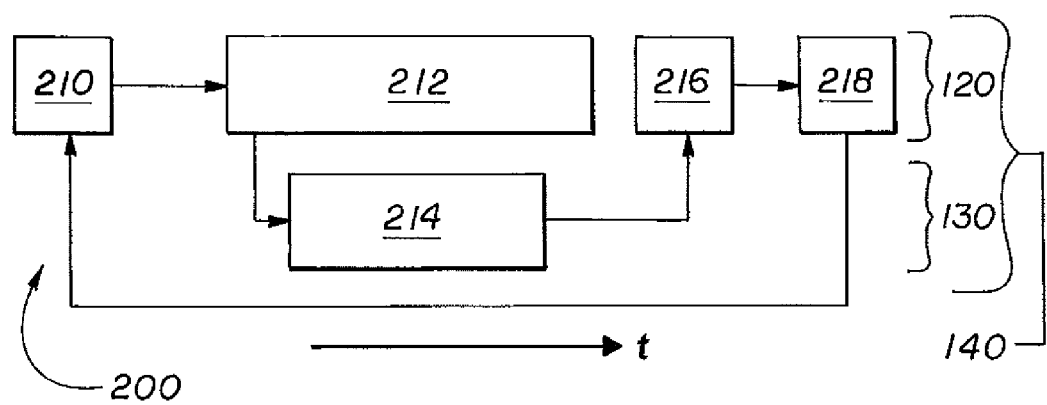

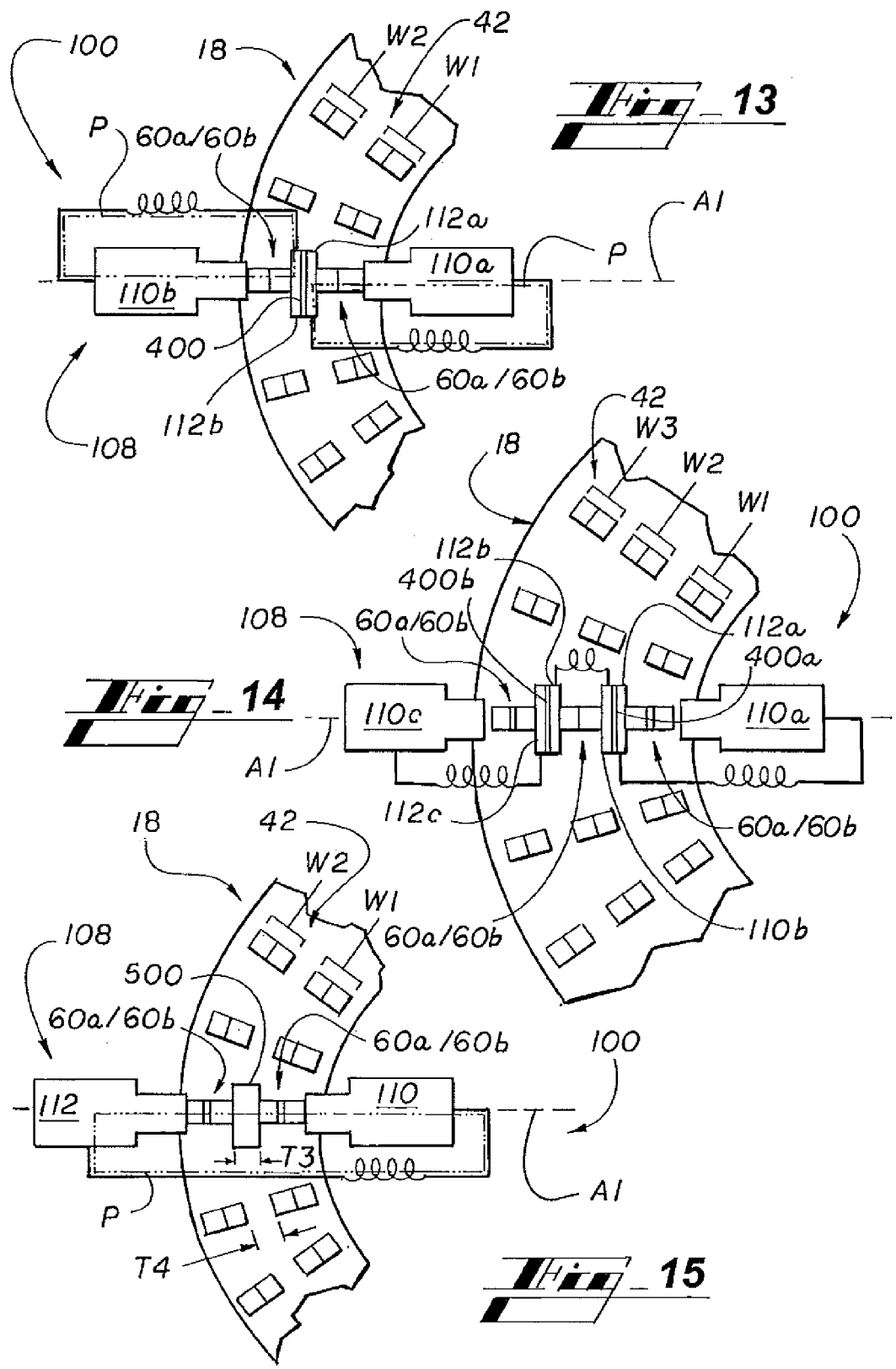

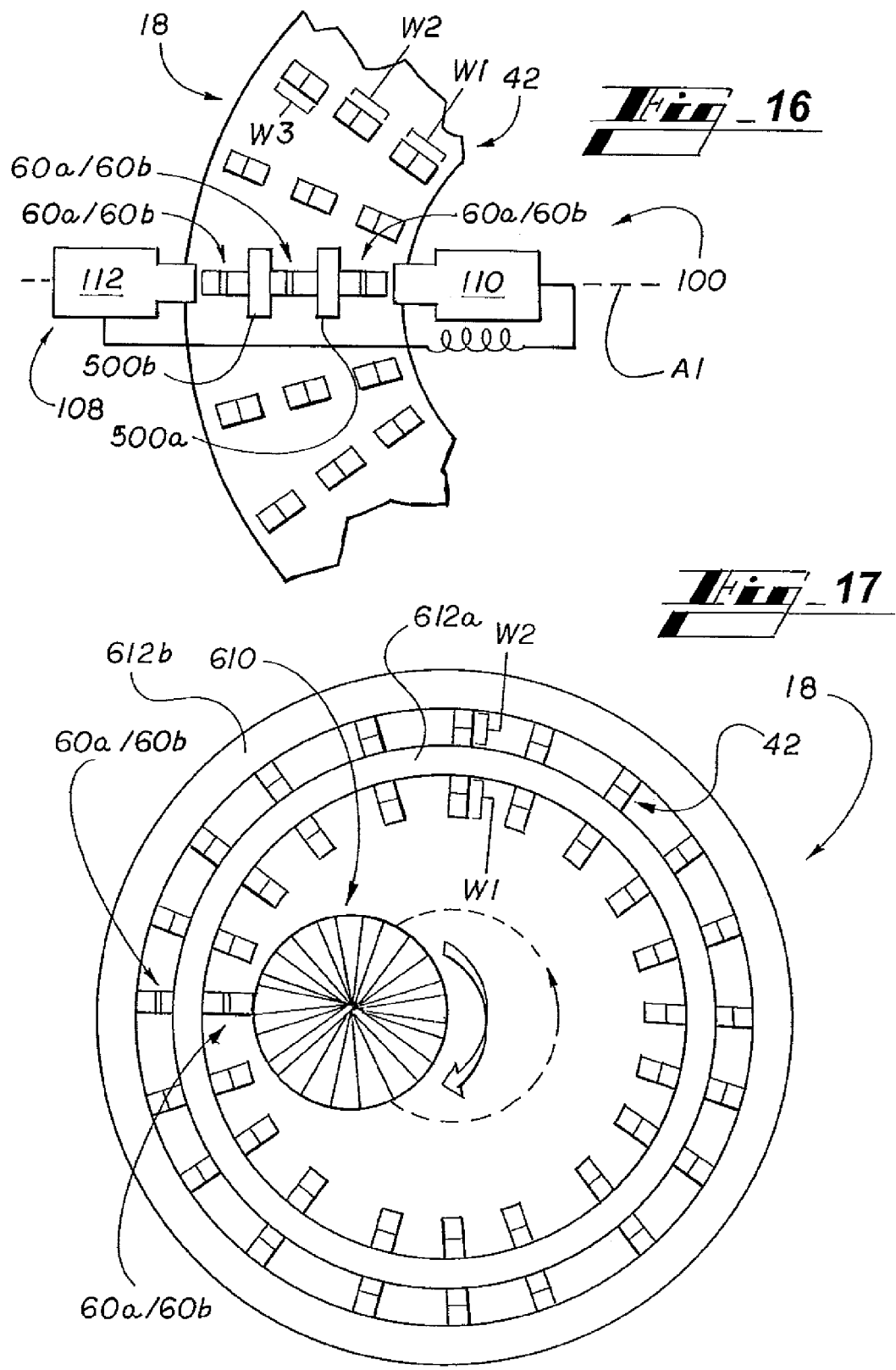

SYSTEMS AND METHODS FOR JOINING WIRES OF A MOTOR STATOR

TECHNICAL FIELD

The technical field is generally systems and methods associated with joining wires of electric motor assemblies.

BACKGROUND

In bar-wound electric motor assemblies, wires are typically welded together to assemble a stator using Tungsten inert gas (TIG) and plasma welding methods. However, such welding methods do not produce quality welds with a sufficient degree of consistency. Quality welds are necessary because if one weld fails, the motor fails. Because hundreds of welds may be required for a single motor, it is important that the welding process be highly robust and efficient to assure weld quality while minimizing welding time.

SUMMARY

The various embodiments provide systems and methods for joining wires of a stator of an electric motor.

In some aspects, the disclosure relates more particularly to an apparatus for joining a wire pair of a stator coil, the apparatus including a tool having a pair of electrodes and control equipment. The control equipment is configured to control the electrodes to apply force to the wire pair to push adjacent wires of the wire pair toward each other and cause current to pass between the pair of electrodes, and so through the wire pair pushed together, at a time at which the force is being applied to the wire pair.

In some aspects, the disclosure relates to an apparatus for joining a wire pair of a stator coil, the apparatus including a tool having a roller electrode having a generally circular or oval profile and being configured to roll along a first end of a row of the wire pair. The tool also has a counter electrode sized and shaped to engage a second end of the wire pair in the row and control equipment. The control equipment is configured to cause the roller electrode to roll against the wire pair at the first end while the counter electrode is positioned adjacent the second end of the wire pair to push wires of the wire pair toward each other. The control equipment is further configured to cause current to pass between the roller electrode and the counter electrode, and so through the wire pair pushed together between the roller electrode and the counter electrode, at a time at which the force is being applied to the wire pair.

In some aspects, the disclosure relates to a method for joining a wire pair, the method including applying a clamping force to a wire pair, passing a current through the wire pair for a selected period of time to heat a welding location between wires of the wire pair to a selected temperature, and applying an upset force to the wire pair to expel an upset from the welding location.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a cross sectional view of an electric motor, according to an exemplary embodiment.

FIG. 2 is a close up partial end elevation view of a stator of the electric motor of FIG. 1.

FIG. 3 is a partial end elevation view of a stator of the electric motor of FIG. 1.

FIG. 4 is a partial perspective view of the stator of FIG. 3.

FIGS. 5-8 are schematic views of an apparatus and steps of a method for joining a wire pair of the stator of FIGS. 2-4, according to an exemplary embodiment.

FIG. 9 is a graphical illustration associated with the apparatus and method of FIGS. 5-8.

FIG. 10 is a block diagram of the method of FIGS. 5-8.

FIG. 13 is a partial plan view of the two-row stator of FIGS. 2-4 and an apparatus that is configured to join wire pairs of the stator, according to an exemplary embodiment.

FIG. 14 is a partial plan view of a three-row stator and an apparatus that is configured to join wire pairs of the stator, according to an exemplary embodiment.

FIG. 15 is a partial plan view of the two-row stator of FIGS. 2-4 and an apparatus that is configured to join wire pairs of the stator, according to an exemplary embodiment.

FIG. 16 is a partial plan view of a three-row stator and an apparatus that is configured to join wire pairs of the stator, according to an exemplary embodiment.

FIG. 17 is a plan view of the two-row stator of FIGS. 2-4 and an apparatus that is configured to join wire pairs of the stator, according to an exemplary embodiment.

FIG. 18 is a partial perspective view of the apparatus of FIG. 17.

DETAILED DESCRIPTION

Figure 11:
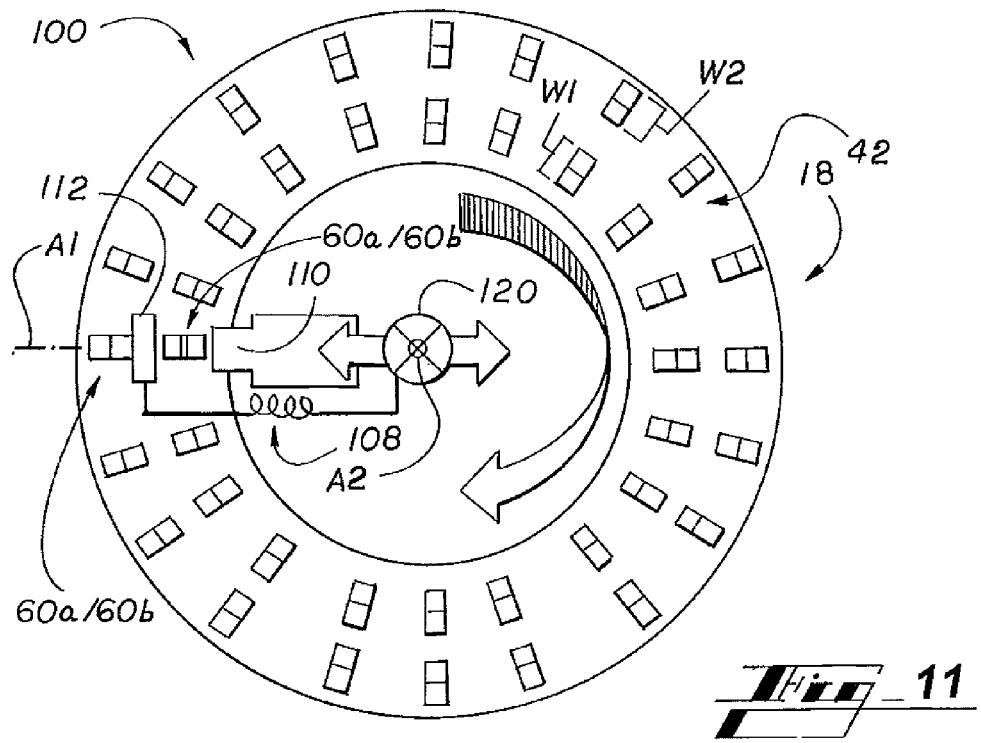
FIG. 11 is a plan view of the stator of FIGS. 2-4 and an apparatus that is configured to join wire pairs of the stator, according to an exemplary embodiment.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Exemplary embodiments are described herein with respect to the manufacture and assembly of bar-wound electric motors such as those that include automotive alternators. However, it is should be understood that the teachings of the disclosure are applicable to joining wires or bars in other manufacturing applications.

Generally described, the systems and methods described herein provide a reliable connection between wires using what is referred to herein as resistance upset welding. Resistance upset welding is fast and productive, and results in welded wire pairs that are of high quality and durable.

Resistance upset welding combines steps of electric resistance welding methods and upset welding methods. Generally, resistance upset welding includes applying a clamping pressure to a wire pair using electrodes and generating heat at an interface between wires of the wire pair by directing electric current through the wire pair using the electrodes. The heat generated by the current is a function of the electrical resistance of the wire pair, the electrode materials, the electrode geometry, the electrode pressure or force on the wire pair, the current through the wire pair, and the time that the current is applied. In general, points of greater resistance along a path between the electrodes and through the wire pair, such as at an interface between wires, generate more heat from current.

Resistance upset welding includes applying force to the wire pair while the pair is heated to an elevated temperature to join the wires at a weld location. The wires are in a solid state at the elevated temperature and are plastically deformed as they are pressed together. The applied force expels wire material, referred to as an upset, from the weld location. The heat and the upset removes surface contaminants (e.g., oxides and oil) from the weld location to strengthen the weld. Surface contaminants in the weld can lead to corrosion or crack formation.

Generally, in forming a joint with the wire pair, a thickness of pair is reduced significantly. As an example, in some cases the thickness of the pair is reduced from an original thickness of the two wires, combined, to between about 30% and about 50% (i.e., about the thickness of one of the original wire thicknesses) of the original thickness of the wires. A width and length of the wires being joined will be increased, proportionally, in response to the decreasing thickness.

To illustrate the systems and methods in greater detail, an exemplary motor is described followed by exemplary apparatuses that are configured to join wire pairs of a stator of the electric motor using resistance upset welding methods.

Referring to FIG. 1, an electric motor 10 includes a rotor 12, which rotates around a shaft 14 within a case 16, and a stator 18 that is secured to an inner wall of the case 16. The stator 18 is configured to interface with the outer circumference of the rotor 12 and the shaft 14 is rotatably supported in the case 16.

A pulley 20 is secured to one end of the shaft 14 for transferring torque from or to the electric motor 10. When the motor 10 is used as a generator, such as an alternator, torque from an engine (not shown) is transferred to the shaft 14 using a belt (not shown). When the motor 10 is used as an engine, torque is transferred from the shaft 14 to the pulley 20.

Slip rings 22 are secured to the other end of the shaft 14 to supply electric current to or receive current from the rotor 12, and brushes 24 are configured and positioned to slide in contact with the slip rings 22. The electric motor 10 also includes a regulator 26 that is configured to regulate the magnitude of an alternating voltage generated in the stator 18 and a rectifier 28 that is configured to convert an alternating current generated in the stator 18 to a direct current.

The rotor 12 includes a rotor coil 30 and a pair of pole cores 32a, 32b. The first pole core 32a is magnetized to a north ("N") polarity by the magnetic flux of the rotor coil 30 and the second pole core 32b is magnetized to south ("S") polarity by the magnetic flux of the rotor coil 30. The pole cores 32a, 32b are secured to the shaft 14 and intermesh adjacent the outside surface of the rotor coil 30.

For using the motor 10 as an engine, the rotor coil 30 is configured and positioned to generate magnetic flux when electric current is passed through the rotor coil 30. Electric current is supplied by, for example, a battery (not shown) to the rotor coil 30 by the brushes 24 and the slip rings 22.

In some embodiments, the rotor is constructed to include permanent magnets. This type of rotor is known as a permanent magnet (PM) rotor, or induction rotor. PM rotors typically include highly-conductive bars, such as bar containing aluminum, copper, or alloys thereof, distributed through a lamination stack of the rotor.

For using the motor 10 as a generator, the rotor 12 is rotated as torque supplied by an actuator (e.g., engine; not shown) is transmitted to the shaft 14 by the belt (not shown) that is attached to the pulley 20. Rotation of the rotor 12 generates a changing magnetic flux used to generate current.

Referring to FIGS. 1 and 4, the stator 18 includes a stator core 40 and a stator coil 42. The stator coil 42 includes wires 60, also commonly referred to as bars, which are wound around the stator core 40 as described in further detail below. Alternating current is generated in the stator coil 42 by changing magnetic flux generated by rotation of the rotor 12. The rotating magnetic field that is imparted to the stator coil 42 generates an electromotive force in the stator coil 42. This alternating electromotive force is converted to a direct current by the rectifier 28 and its voltage is regulated by the regulator 26.

Referring to FIGS. 2-4, configuration of the stator coil 42 is described in more detail. The stator core 40 has a generally cylindrical shape. The stator core 40 has a plurality of slots 50 (see FIGS. 2 and 3) that extend in an axial direction (i.e., along a second axis A2, of the shaft 14 and the rotor 12, shown in FIGS. 5-7). And the slots 50 are evenly spaced and disposed at a common angular pitch around the circumference of the stator core 40.

The stator coil 42 is constructed by joining wire segments 60 (see FIG. 2) into one unit (see FIGS. 3 and 4). In some embodiments, wire segments 60 are heavy-gage copper wires. Referring further to FIG. 2, wire segments 60 are first configured to have a generally U-shape and straight ends of the U-shape are inserted into respective slots 50. Portions of the wire segments 60 that extend outside the slots 50 are bent, as shown by hidden lines in FIG. 2, such that ends 62 of wire segments 60 are positioned to be joined to ends 62 of wire segments 60 of adjacent wire pairs, as shown in FIGS. 3 and 4. Referring to FIGS. 2-4, the free ends 62a, 62b are twisted, bent, pressed together, or otherwise positioned so as to be approximately aligned with one another.

The ends 62 of wire segments 60 are joined to complete a number of phases. For example, stator coil 42 includes multiple phases with the wires in each phase being connected to one another and separate from other phases. For purposes of illustration, exemplary methods of joining the free ends 62a, 62b of a single pair of wire segments 60a, 60b are described in further detail below. Hereinafter, the pair of wire segments 60a, 60b is referred to as a wire pair 60a/60b.

An apparatus 100 for joining the wire pair 60a/60b is now described with reference to FIG. 5. The apparatus 100 includes a tool 108 including a first electrode 110 and a second electrode 112. The electrodes 110, 112 are configured to apply a force 310 (FIGS. 6 and 7) to the wire pair 60a/60b and to direct an electric current through the wire pair 60a/60b.

A shape of the electrodes depends on requirements of the welded ends. For instance, the electrodes in some embodiments are generally flat-faced. In a more particular embodiment, a generally flat face of at least one of the electrodes is tapered in at least one direction to constrain flow of material (wire material, etc.) to a corresponding at least one direction.

Tapering the electrode faces, in some cases, improves welding characteristics (e.g., a quality of the resulting joint). An example of another, more complex, shape for the electrode faces is trapezoidal. Trapezoidal and other more complex shapes further constrain material reduction at the free ends of the wire pair 60a/60b in forming the joint.

The apparatus 100 includes control equipment, or positioning equipment, represented schematically by reference numeral 120, that is configured to position the tool 108, and specifically for instance, the electrodes 110, 112, with respect to the wire pairs 60a/60b. In some embodiments, the positioning equipment 120 also operates to apply the force 310 to the wire pairs 60a/60b via the electrodes 110, 112.

The positioning equipment 120 includes structures such as arms and fingers, motors and other actuators, actuated structures for rotating the stator, actuated structures for translating and rotating the tool, actuated structures for changing the distance between the electrodes, computer numerically-controlled (CNC) systems, combinations thereof, and the like. In embodiments described in further detail below, the positioning equipment 120 is configured to position the tool 108 and/or the stator coil 42 at certain angular positions, also commonly referred to as index positions. The angular position can be measured in radians or degrees with respect to the center axis A2 of the shaft 14 and the rotor 12. In general, the positioning equipment 120 is configured to move the tool 108 and/or stator 18 to various positions for joining wire pairs 60a/60b, and also to apply forces when in position for joining a wire pair 60a/60b.

With continued reference to FIG. 5, the apparatus 100 further includes a current supply 130 that is configured to supply current along a current path P (see FIG. 6) between the electrodes 110, 112. When the electrodes 110, 112 clamp the wire pair 60a/60b between the electrodes 110, 112, the current path P is created between the electrodes 110, 112, such that current 320 can move through the wire pair 60a/60b from the first electrode 110 to the second electrode 112. As an example, current supply 130 includes capacitors that store and discharge electrical energy through the electrodes 110, 112. In embodiments with more than one set of electrodes, the current supply includes capacitors for each set of electrodes.

The apparatus 100 further includes a control unit 140 that is configured to control the positioning equipment 120 and the current supply 130. The control unit 140 includes a computer 142 with a processor 144 and computer readable media such as memory 146 that is configured to store computer executable instructions. The memory 146 stores one or more program modules, represented by control module 148, of computer executable instructions that, when executed by the processor 144, cause the control unit 140 to control the apparatus 100 to perform methods described in further detail below. For example, the computer executable instructions of the control module 148, when executed by the processor 144, cause the control unit 140 to synchronize the force 310 applied to the wire pair 60a/60b by the electrodes 110, 112 and the current 320 supplied to the electrodes 110, 112 according to methods described herein.

While the methods described herein may, at times, be described in a general context of computer-executable instructions, the methods of the present disclosure can also be implemented in combination with other program modules and/or as a combination of hardware and software. The term program module, or variants thereof, is used expansively herein to include routines, applications, programs, components, data structures, algorithms, and the like. Program modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Computer-readable media includes, for example, volatile media, non-volatile media, removable media, and non-removable media. The term computer-readable media and variants thereof, as used in the specification and claims, refer to storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

Referring to FIGS. 5-10, a method 200 of joining the wire pairs 60a/60b is described. The method 200 is performed by the apparatus 100 according to computer executable instructions of the control module 148. Referring to FIGS. 5 and 10, a positioning step 210 includes positioning the electrodes 110, 112 with the wire pair 60a/60b therebetween by controlling the positioning equipment 120 with the control unit 140. The positioning step 210 can include rotating the stator coil 42 to an index position, rotating a robotic arm to which the tool 108 is attached to an index position, extending or contracting a robotic arm to radially position the tool 108 at a radial distance from the center axis A2, spreading or narrowing robotic fingers to which the electrodes 110, 112 are respectively attached to change the distance between the electrodes 110, 112, combinations thereof, and the like.

The electrodes 110, 112 are positioned on opposite sides of the wire pair 60a/60b at an index position and aligned along a first radial axis A1 that extends outwardly from the center axis A2 of the stator 18. The first electrode 110 is positioned inside the wire pair 60a/60b along the radial axis A1 and the second electrode 112 is positioned outside the wire pair 60a/60b along the radial axis A1. Here, the terms inside and outside are used to describe position relative to the second, center axis A2. The first electrode 110 is positioned to contact a first of the wires 60a and the second electrode 112 is positioned to contact a second of the wires 60b. In embodiments where the stator coil 42 has multiple rows W of wire pairs (see FIG. 11-17), one or both of the electrodes 110, 112 is configured to be positioned between wire pairs 60a/60b in adjacent rows W.

Referring to FIGS. 6, 9, and 10, a clamping force step 212 includes pressing the wires 60a, 60b against one another by bringing the electrodes 110, 112 towards each other along the first radial axis A1 during a clamping force interval 316. The control unit 140 controls the positioning equipment 120 to bring the electrodes 110, 112 towards each other. As the electrodes 110, 112 are brought towards each other, they contact the wires 60a, 60b and press the wires 60a, 60b against one another at a desired weld location 150 with a force 310 until the force 310 reaches a clamping force 312 that falls within a clamping force range 314. The electrical resistance at the weld location 150 is a function of the clamping force 312. Particularly, the resistance at the weld location 150 is inversely proportional to the clamping force 312. The weld location 150 is at the interface of the wires 60a, 60b. The electrodes 110, 112 are held in place to maintain the clamping force 312 during the clamping force interval 316.

A heating step 214 includes controlling the current supply 130 with the control unit 140 to discharge a current 320 through the electrodes 110, 112 during a heating interval 322.

The current 320 is increased to or toward a max current 324 that falls within a target current range 326. The control unit 140 directs the current 320 along the current path P from the first electrode 110, through the wire pair 60a/60b, and to the second electrode 112. The current 320 is discharged in a relatively short period of time t (heating interval 322) to generate highly localized heat at the weld location 150 as described in further detail below. The method 200 may include any of a variety of relationships between the heating interval 322 and the clamping force interval 316 without departing from the scope of the present invention. For instance, in some embodiments, the clamping force 312 is maintained during the heating step 214 so that the heating interval 322 is coextensive with or within the clamping force interval 316. In some contemplated embodiments, the heating interval 322 begins before the beginning of the clamping force interval 316 and/or ends after the clamping force interval 316.

Current 320 generates heat in the wire pair 60a/60b as it moves along the current path P. As described above, the heat (H) (Joules) applied by the apparatus 100 at the weld location 150 of the wire pair 60a/60b is a function of the current 320 (I) (Amperes) discharged through the electrodes 110, 112, the resistance (R) (Ohms) at the weld location 150, and the time (t) (seconds) over which the current 320 (I) is applied. For example, the function is in some cases given by $H=I^2 Rt$. As also mentioned previously, the resistance (R) is a function of the clamping force 312.

The heat H increases a temperature at the weld location 150 to a welding temperature 330 in a temperature range 332. In some embodiments, the wires 60a, 60b remain in a solid state within the temperature range 332 and can be plastically deformed to bond the wire pair 60a/60b. To control the welding temperature 330, the profiles of the current 320 and the clamping force 312 are selected and controlled by the control unit 140. For example, the profile of the current 320 and clamping force 312 can be optimized to minimize time t (e.g., time of the heating interval 322) for increased efficiency.

Referring to FIGS. 7, 9, and 10, an upset force step 216 includes increasing the force 310 by bringing the electrodes 110, 112 further together along the first radial axis A1. In some embodiments, an upset force step 216 is not performed. In the upset force step 216, the control unit 140 controls the positioning equipment 120 to bring the electrodes 110, 112 closer together. The force 310 is increased until the force 310 reaches an upset force 340 that falls within an upset force range 342. The upset force 340 is applied to the wire pair 60a/60b during an upset force interval 344 that is immediately after, or overlaps with, the heating interval 322.

The upset force 340 is applied to the wire pair 60a/60b while the welding temperature 330 is in the temperature range 332 to plastically deform and bond the wire pair 60a/60b. The upset force 340 plastically deforms the heated wire pair 60a/60b and expels an upset 160 (FIG. 7) of oxidized metal from the weld location 150. As such, a solid-state bond is created at the interface of the wires 60a, 60b (i.e., at the weld location 150 of the wire pair 60a/60b). The upset force 340 reduces the thickness of the wire pair 60a/60b and generates strains to achieve desired weld strength. Generally, such strains are too low to achieve via cold pressure bonds.

The electrodes 110, 112 are cooled (e.g., water cooled with a water cooling system) to reduce the temperature of the weld location 150 and solidify the weld. Referring to FIGS. 8 and 10, according to a finishing step 218, the electrodes 110, 112 are removed from the joined wire pair 60a/60b and the method 200 is repeated for the next wire pair.

An exemplary application of the method 200 is now described in further detail for heavy-gage copper wires 60a/60b. According to the clamping force step 212, the clamping force 312 is in the clamping force range 314 of about fifty pounds-force to about two-hundred pounds-force. According to the heating step 214, the current 320 (I) is increased to a max current 324 that falls in the current range 326 that is about twenty kiloAmps to about fifty kiloAmps for a time t (heating interval 322) in the range of about one to about ten milliseconds. The associated resistance R at the weld location 150 is very small and depends on several resistances (e.g., resistance of electrodes, electrode to wire contact resistance of the wires, and the contact resistance of the wires). The welding temperature 330 at the weld location 150 is in the temperature range 332 that is about seven-hundred Celsius to about nine-hundred Celsius. According to the upset force step 216, the upset force 340 is in the range of about one-thousand pounds-force to about two-thousand pounds-force. The original thickness 152 of the wire pair 60a/60b is reduced by about thirty percent to about seventy percent in the process of joining the wire pair 60a/60b. For example, the thickness is reduced by about thirty percent in order to provide sufficient strength at the weld location 150. The upset force 340 and the duration of the upset force 340 are precisely controlled in order to control the cross-section of the welded wire pair 60a/60b.

Exemplary embodiments of apparatuses are now described in further detail. Certain apparatuses are configured with respect to a stator 18 with two rows W1, W2 of wire pairs and other apparatuses are configured with respect to stators with three rows W1, W2, W3 of wire pairs 60a/60b. However, it should be understood that the teachings can be generally applied to one row or multiple rows of wire pairs. At each of a number of index positions, the illustrated stators 18 include wire pairs 60a/60b, one in each row W, that are aligned along a radial axis A1. For example, a stator with seventy wire pairs 60a/60b in each row W has about seventy index positions with each index position corresponding to a number of wire pairs equal to the number of rows.

Referring to FIG. 11, the apparatus 100 includes positioning equipment 120 that is configured to rotate the tool 108 about the second, center axis A2 ("z" axis), to rotate the stator 18 about the center axis A2 ("z" axis), to translate the tool 108 up and down along the center axis A2, to translate the tool 108 in and out along the first, radial axis A1 ("x" axis), and/or to move the electrodes 110, 112 towards each other and away from one another along the radial axis A1. As such, the positioning equipment 120 is configured to position the electrodes 110, 112 to join each wire pair 60a/60b in each row W.

Rotation of the stator 18 and/or the tool 108 moves the electrodes 110, 112 along a row W. Translation in and out moves the electrodes 110, 112 between rows W1, W2. Translation up and down moves the electrodes 110, 112 to accommodate different wire pair heights and to avoid contact with wire pairs when moving. Combinations of rotation and translation can be used to position the electrodes 110, 112 with respect to any wire pair to join the wire pair, for example, according to the method 200. As such the apparatus 100 of FIG. 11 has the flexibility to weld wire pairs 60a/60b for multiple motor types, of various heights, row spacing, numbers of rows, and the like. For example, the apparatus 100 performs one hundred forty welds in one hundred forty cycle times. For reference, a cycle time per weld can be less than about one second.

Figure 12:
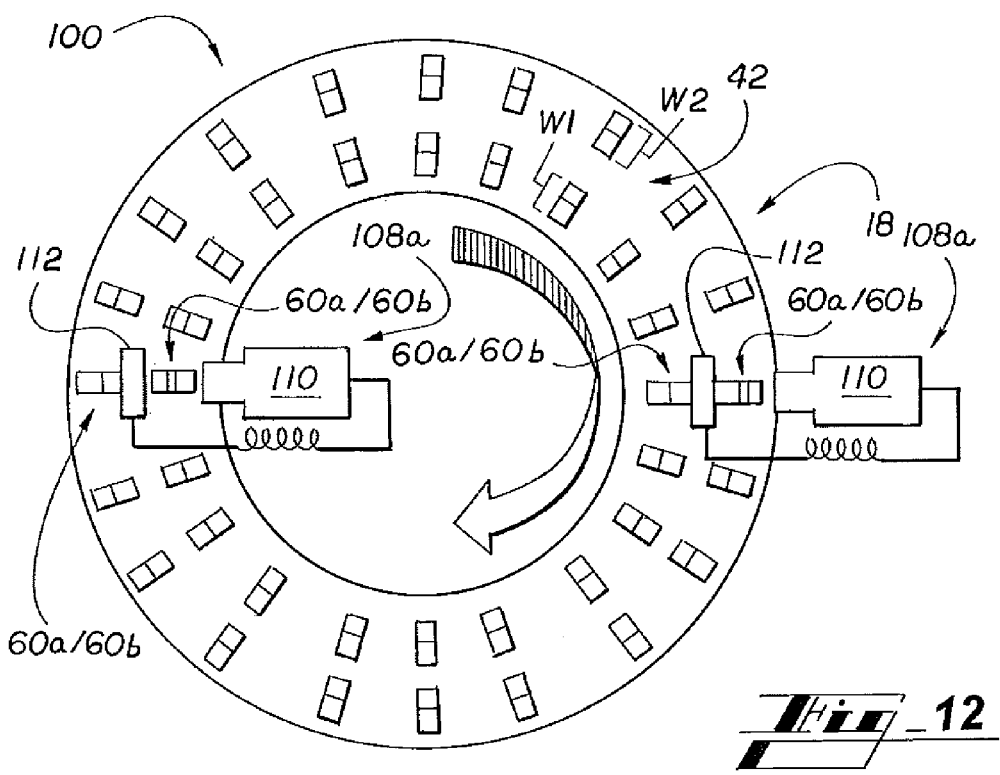
FIG. 12 is a plan view of the stator of FIGS. 2-4 and an apparatus that is configured to join wire pairs of the stator, according to an exemplary embodiment.

Referring to FIG. 12, the apparatus 100 is configured with respect to a two-row stator 18 and includes a pair of tools 108a, 108b, each with a pair of electrodes 110, 112. The tools 108a, 108b are positioned at different index positions. The first tool 108a is configured to join the wire pairs of the inside row W1 and the second tool 108b is configured to join the wire pairs of the outside row W2. Since the tools 108a, 108b simultaneously welds wire pairs 60a/60b in the rows W1, W2, the apparatus 100 performs one hundred forty welds in seventy cycle times. In this configuration, welding each of the wire pairs can be achieved by simply rotating the stator 18 or the tools 108a, 108b to each index position.

Referring to FIGS. 13 and 14, the apparatus 100 includes a tool 108 that is configured to simultaneously weld multiple wire pairs at each index position according to methods described herein. The tool 108 includes multiple pairs of electrodes 110, 112 that are all aligned along the radial axis A1 at each index position. Each pair of electrodes 110, 112 is configured to join a wire pair 60a/60b in a row W. In each case, electrodes (e.g., electrodes 112a, 112b in FIG. 13 and electrodes 112A, 110b, 112b, 112c in FIG. 14) that are positioned between rows W are insulated from one another by insulating spacers 400 to isolate the current flow through each respective set of electrodes and wire pair. The apparatus of FIG. 13 is configured with respect to a two-row stator 18 and the apparatus of FIG. 14 is configured with respect to a three-row stator. Where the stator 18 includes seventy index positions, the apparatus of FIG. 13 performs one-hundred forty welds in seventy cycle times and the apparatus of FIG. 14 performs two-hundred ten welds in seventy cycle times. As with the apparatus of FIG. 12, welding each of the wire pairs can be achieved by simply rotating the stator 18 or the tool 108 to each index position.

The apparatus of FIG. 13 includes a first electrode 110b outside of the outermost wire pair 60a/60b, second and third electrodes 112b, 112a in between the outermost wire pair 60a/60b and the innermost wire pair 60a/60b, and a fourth electrode 110a inside the innermost wire pair 60a/60b. The second electrode 112b and the third electrode 112a are separated by the insulating spacer 400. The first and second electrodes 110b, 112b are configured to weld the outermost wire pair 60a/60b and the third and fourth electrodes 112a, 110a are configured to weld the innermost wire pair 60a/60b. The apparatus of FIG. 14 is similar and includes an additional set of electrodes that are configured to weld a middle row wire pair 60a/60b. The apparatus includes electrodes 110a, 112a, 110b, 112b, 110c, 112c and insulating spacers 400a, 400b.

In alternative embodiments, multiple tools are used to further reduce the number of cycle times. For example, where the apparatus of FIG. 13 includes two of the described tools, such an apparatus performs one-hundred forty welds in thirty-five cycle times. For apparatuses with other numbers of tools, the apparatus performs one-hundred forty welds in a number of cycles equal to seventy divided by the number of tools.

Referring to FIGS. 15 and 16, the apparatus 100 includes a tool 108 that is configured to simultaneously weld multiple wire pairs 60a/60b at an index position according to methods described herein. The tool 108 includes a pair of electrodes 110, 112 and one or more conductive spacers 500. The first electrode 110 is inside the innermost wire pair 60a/60b and the second electrode 112 is outside the outermost wire pair 60a/60b. Each conductive spacer 500 is configured to be positioned between wire pairs 60a/60b in adjacent rows W that are aligned at an index position. The conductive spacer 500 has a thickness T3 that is substantially equal to the distance T4 between wire pairs in adjacent rows W. The one or more conductive spacers 500 provide a current path P between wire pairs 60a/60b and transfer forces between wire pairs 60a/60b. The current level and the force level are optimized for the number welds at a single index position. The conductive spacer 500 includes a conductive material that remains solid during the method and has surface properties that minimize sticking or bonding to the wire pairs during the method. Such materials include tungsten and the like. In some embodiments, the positioning equipment 120 positions the spacer(s) 500 appropriately between wire pairs 60a/60b.

FIG. 15 illustrates an apparatus with a tool 108 configured for a two-row stator that includes the conductive spacer 500 positioned between wire pairs 60a/60b in adjacent rows W1, W2, a first electrode 112 positioned outside of the outside row wire pair 60a/60b, and a second electrode 110 positioned inside of the inside row wire pair 60a/60b. The electrodes 110, 112 apply force to press the wire pairs 60a/60b against the conductive spacer 500 to create a current path P.

FIG. 16 illustrates an apparatus with a tool 108 configured for a three-row stator 18 that includes conductive spacers 500a, 500b positioned between wire pairs 60a/60b in adjacent rows W1, W2 and W2, W3, a first electrode 112 positioned outside of the wire pair 60a/60b in the outside row W3, and a second electrode 110 positioned inside of the wire pair 60a/60b in the inside row W1. The first conductive spacer 500b is positioned between the middle row W2 and the outside row W3 and the second conductive spacer 500a is positioned between the middle row W2 and the inside row W1. The electrodes 110, 112 apply force to press the inside wire pair 60a/60b and the outside wire pair 60a/60b against the conductive spacers 500a, 500b, which press against the middle wire pair 60a/60b to create a current path P.

Referring to FIGS. 17 and 18, the apparatus includes a tool comprising an electrode wheel, or roller electrode 610, an inner counter electrode, such as an inner ring counter electrode 612a, and an outer counter electrode, such as an outer ring counter electrode 612b. In some embodiments, there is only one counter electrode, such as for cases in which the stator coil includes only a single row of wire pairs 60a/60b. While the electrode wheel 610 may have various shapes without departing from the scope of the present invention, in some embodiments the electrode wheel has a generally circular or oval profile.

Positioning equipment is configured to roll the electrode wheel 610 against the inside of the innermost row W1 of wire pairs 60a/60b to rapidly weld the wire pairs 60a/60b by pressure and heat from current according to the principles described herein. In one case, the axis of the electrode wheel 610 is stationary and the stator orbits the electrode wheel 610. In another case, the electrode wheel 610 orbits inside or outside of the stator.

When the electrode wheel 610 rolls against a wire pair 60a/60b, it applies a force to press the wire pair 60a/60b against the inner electrode ring 612a. The inner electrode ring 612a presses against the wire pair 60a/60b between the electrode rings 612a, 612b, which presses the wire pair 60a/60b against the outer electrode ring 612b to create a current path, including between the wheel 610 and electrode ring 612.

In one embodiment, the electrode wheel 610 includes a single electrode that continuously applies current. In another embodiment, the electrode wheel includes a number of electrodes that are segmented to separate the welding operation that occurs at each wire pair. Here, the apparatus intermittently applies current as a segmented electrode in the electrode wheel 610 contacts an associated wire pair 60a/60b. Segmented electrodes are utilized, in some embodiments, in cases in which a distance between adjacent wire pairs 60a/60b is small, thereby avoiding the possibility of uncontrolled arcing.

The apparatus isolates welding processes at different index positions. The electrode wheel includes welding segments that are associated with index positions. In some embodiments, the welding segments are separated from one another by insulating segments, such as spacers described herein.

The above-described embodiments are merely exemplary illustrations of implementations that are set forth for a clear understanding of principles. Variations, modifications, and combinations associated with the above-described embodiments may be made without departing from the scope of the claims. All such variations, modifications, and combinations are included herein by the scope of this disclosure and the following claims.

What is claimed is:

1. An apparatus for joining a wire pair of a stator coil, comprising:
   a tool including:
      a pair of electrodes; and
      control equipment configured to:
         control the electrodes to apply force to the wire pair to push adjacent wires of the wire pair toward each other; and
         cause current to pass between the pair of electrodes, and so through the wire pair pushed together, at a time at which the force is being applied to the wire pair.

2. The apparatus of claim 1, wherein:
   the wire pair is a first wire pair; and
   the tool is configured to join the first wire pair and at least one other wire pair simultaneously, including the control equipment being configured to:
      cause force to be applied to the second wire pair to push the second wire pair toward each other; and
      cause current to pass through the second wire pair pushed together to join the wire pair.

3. The apparatus of claim 2, wherein the first wire pair and the at least one other wire pair are positioned in different rows of the stator coil.

4. The apparatus of claim 2, wherein:
   the first wire pair is positioned in a row of the stator coil; and
   the at least one other wire pair is positioned in a different row of the stator coil.

5. The apparatus of claim 2, wherein:
   the first wire pair is positioned at an index position of the stator coil; and
   the at least one other wire pair is positioned at the same index position.

6. The apparatus of claim 2, wherein:
   the first wire pair is positioned at an index position of the stator coil; and
   the at least one other wire pair is positioned at a different index position.

7. The apparatus of claim 2, wherein:
   the pair of electrodes is a first pair of electrodes; and
   the tool includes a second pair of electrodes.

8. The apparatus of claim 7, wherein:
   the first pair of electrodes is positioned and configured to join the first wire pair, the first wire pair being positioned in a first row of the stator coil; and
   the second pair of electrodes is positioned and configured to join the second wire pair, the second wire pair being positioned in a second row of the stator coil.

9. The apparatus of claim 2, wherein:
   the tool further comprises at least one conducting spacer; and
   the control equipment is further configured to position the spacer between the first wire pair and the second wire.

10. The apparatus of claim 9, wherein the conducting spacer has a dimension that is substantially equal to a distance between the first wire pair and the second wire pair.

11. An apparatus for joining a wire pair of a stator coil, the apparatus comprising:
    a tool including:
       a roller electrode having a generally circular or oval profile and being configured to roll along a first end of a row of the wire pair;
       a counter electrode sized and shaped to engage a second end of the wire pair in the row; and
       control equipment configured to:
          cause the roller electrode to roll against the wire pair at the first end while the counter electrode is positioned adjacent the second end of the wire pair to push wires of the wire pair toward each other; and
          cause current to pass between the roller electrode and the counter electrode, and so through the wire pair pushed together between the roller electrode and the counter electrode, at a time at which the force is being applied to the wire pair.

12. The apparatus of claim 11, wherein the counter electrode is a ring electrode surrounding the second end of the wire pair.

13. The apparatus of claim 11, wherein:
    the wire pair is a first wire pair in a first row of the stator coil;
    the apparatus further includes a second counter electrode sized and shaped to engage a second end of a second wire pair in a second row of the stator coil.

14. The apparatus of claim 13, wherein the second counter electrode is a ring electrode surrounding the second end of the second wire pair.

* * * * *